(12) United States Patent
Wang et al.

(10) Patent No.: US 9,405,547 B2
(45) Date of Patent: Aug. 2, 2016

(54) REGISTER ALLOCATION FOR ROTATION BASED ALIAS PROTECTION REGISTER

(75) Inventors: Cheng Wang, San Ramon, CA (US); Youfeng Wu, Palo Alto, CA (US)

(73) Assignee: INTEL CORPORATION, Santa Clara, CA (US)

( * ) Notice: Subject to any disclaimer, the term of this patent is extended or adjusted under 35 U.S.C. 154(b) by 324 days.

(21) Appl. No.: 13/082,146

(22) Filed: Apr. 7, 2011

(65) Prior Publication Data

US 2012/0260072 A1     Oct. 11, 2012

(51) Int. Cl.
    *G06F 9/38* (2006.01)
(52) U.S. Cl.
    CPC .............. *G06F 9/3842* (2013.01); *G06F 9/384* (2013.01); *G06F 9/3838* (2013.01)
(58) Field of Classification Search
    CPC ...................................................... G06F 9/3838
    USPC ....................................................... 712/217
    See application file for complete search history.

(56) References Cited

U.S. PATENT DOCUMENTS

| | | | | |
|---|---|---|---|---|
| 5,941,983 | A * | 8/1999 | Gupta et al. | 712/214 |
| 6,195,676 | B1 * | 2/2001 | Spix et al. | 718/107 |
| 6,832,370 | B1 | 12/2004 | Srinivasan et al. | |
| 7,089,404 | B1 * | 8/2006 | Rozas et al. | 712/217 |
| 7,634,635 | B1 * | 12/2009 | Holscher et al. | 711/220 |
| 2003/0200540 | A1 | 10/2003 | Kumar et al. | |
| 2004/0133766 | A1 * | 7/2004 | Abraham et al. | 712/217 |
| 2006/0225061 | A1 | 10/2006 | Ludwig | |
| 2008/0288930 | A1 * | 11/2008 | Chen et al. | 717/155 |
| 2010/0070958 | A1 | 3/2010 | Takagi | |

FOREIGN PATENT DOCUMENTS

| | | |
|---|---|---|
| CN | 1242087 A | 1/2000 |
| CN | 1268230 A | 9/2000 |
| CN | 1355902 A | 6/2002 |

OTHER PUBLICATIONS

"PCT Search Report and Written Opinion", PCT/US2011/062470, (Jul. 30, 2012), 9 pages.
International Preliminary Report on Patentability for PCT Patent Application No. PCT/US2011/062470 mailed Oct. 17, 2013, 6 pgs.
Non-Final Office Action for Taiwan Patent Application No. 100145055 mailed May 30, 2014, 14 pages.

* cited by examiner

*Primary Examiner* — Andrew Caldwell
*Assistant Examiner* — Jyoti Mehta
(74) *Attorney, Agent, or Firm* — Schwabe, Williamson & Wyatt, P.C.

(57) ABSTRACT

A system may comprise an optimizer/scheduler to schedule on a set of instructions, compute a data dependence, a checking constraint and/or an anti-checking constraint for the set of scheduled instructions, and allocate alias registers for the set of scheduled instructions based on the data dependence, the checking constraint and/or the anti-checking constraint. In one embodiment, the optimizer is to release unused registers to reduce the alias registers used to protect the scheduled instructions. The optimizer is further to insert a dummy instruction after a fused instruction to break cycles in the checking and anti-checking constraints.

16 Claims, 12 Drawing Sheets

| original code | scheduled code | register ORD | valid_all | valid_st | mask |
|---|---|---|---|---|---|
| AHPTR=0 | | | | | |
| store_0 | store_5 | 5 | 000000 | 000000 | 000000 |
| store_1 | store_2 | 2 | 100000 | 100000 | 100000 |
| store_2 | store_0 | 0 | 100100 | 100100 | 100100 |
| load_3 | load_4 | 4 | 100101 | 100101 | 100000 |
| load_4 | store_1 | 1 | 110101 | 100101 | 110100 |
| store_5 | load_3 | 3 | 110111 | 100111 | 100000 |

In the scheduled code, for instruction n with register ORD(n), we get:

$valid\_all(n) = 0$     if $n = 0$
$\quad\quad\quad\quad\quad = valid\_all(n-1) \mid (1 \ll ORD(n-1))$     if $n > 0$ $valid\_st(n) = 0$     if $n = 0$
$\quad\quad\quad\quad\quad = valid\_st(n-1) \mid (1 \ll ORD(n-1))$     if $n > 0$ and $n-1$ is store
$\quad\quad\quad\quad\quad = valid\_st(n-1)$     if $n > 0$ and $n-1$ is load $mask(n) = valid\_all(n) \;\&\; \sim((1 \ll ORD(n)) - 1)$     if n is store
$\quad\quad\quad\;\; = valid\_st(n) \;\&\; \sim((1 \ll ORD(n)) - 1)$     if n is load

FIG. 2A

| original code (210) | scheduled code (220) | register ORD and P/C bits (232) | valid_all (240) | valid_st (250) | mask (260) |
|---|---|---|---|---|---|
| AHPTR=0 (270) | | | | | |
| store_0 | store_5 | 2 (P) | 000 | 000 | - |
| store_1 | store_2 | 0 (P/C) | 100 | 100 | 100 |
| store_2 | store_0 | 0 (C) | 101 | 101 | 101 |
| load_3 | load_4 | 1 (P/C) | 101 | 101 | 100 |
| load_4 | store_1 | 0 (C) | 111 | 101 | 111 |
| store_5 | load_3 | 1 (C) | 111 | 101 | 100 |

In the scheduled code, for instruction n with register ORD(n), P(n) and C(n), we get:

$$valid\_all(n) = 0 \quad \text{if } n = 0$$
$$= valid\_all(n-1) \mid (1 << ORD(n-1)) \quad \text{if } n > 0 \text{ and } P(n-1)$$
$$= valid\_all(n-1) \quad \text{otherwise}$$

$$valid\_st(n) = 0 \quad \text{if } n = 0$$
$$= valid\_st(n-1) \mid (1 << ORD(n-1)) \quad \text{if } n > 0, n-1 \text{ is a store and } P(n-1)$$
$$= valid\_st(n-1) \quad \text{otherwise}$$

$$mask(n) = valid\_all(n) \ \& \ \sim((1 << ORD(n)) - 1) \quad \text{if } n \text{ is a store and } C(n)$$
$$= valid\_st(n) \ \& \ \sim((1 << ORD(n)) - 1) \quad \text{if } n \text{ is a load and } C(n)$$
$$= \text{no compute of mask for checking} \quad \text{otherwise}$$

Fig. 2B

| original code (210) | scheduled code (220) | register ORD and P/C bits (232) | valid_all (240) | valid_st (250) | mask (260) |
|---|---|---|---|---|---|
| AHPTR=0 (270) | | | | | |
| store_0 | store_5 | 1 (P) | 00 | 00 | - |
| store_1 | store_2 | 0 (P/C) | 10 | 10 | 10 |
| store_2 | store_0 | 0 (C) | 11 | 11 | 11 |
| load_3 | load_4 | 1 (C) | 11 | 11 | 10 |
| load_4 | store_1 | 0 (C) | 11 | 11 | 11 |
| store_5 | load_3 | 1 (C) | 11 | 11 | 10 |

Fig. 2C

| original code | scheduled code | register ORD and P/C bits | valid_all | valid_st | mask |
|---|---|---|---|---|---|
| AHPTR=0 270 | | 232 | 240 | 250 | 260 |
| store_0 | load_3 | 1 (P) | 00 | 00 | - |
| load_1 | store_2 | 1 (C) | 10 | 00 | 10 |
| store_2 | load_1 | 0 (P) | 10 | 00 | - |
| load_3 | store_0 | 0 (C) | 11 | 00 | 11 |

Data dependences: store_0 → load_1, store_2 → load_3
Checking constraints: store_0 ⇒$_c$ load_1, store_2 ⇒$_c$ load_3

FIG. 2D

| original code | scheduled code | register ORD and P/C bits | valid_all | valid_st | mask |
|---|---|---|---|---|---|
| AHPTR=0 270 | | 232 | 240 | 250 | 260 |
| store_0 | load_3 | 0 (P) | 00 | 00 | - |
| load_1 | store_2 | 0 (C) | 01 | 00 | 01 |
| store_2 | load_1 | 1 (P) | 01 | 00 | - |
| load_3 | store_0 | 1 (C) | 11 | 00 | 10 |

Data dependences: store_0 → load_1, store_2 → load_3
Checking constraints: store_0 ⇒$_c$ load_1, store_2 ⇒$_c$ load_3

FIG. 2E

| Original code | scheduled code | register ORD and P/C bits | valid_all | valid_st | mask |
|---|---|---|---|---|---|
| AHPTR=0 | 270 | 232 | 240 | 250 | 260 |
| store_0 | load_3 | 0 (P) | 0 | 0 | - |
| load_1 | store_2 | 0 (C) | 1 | 1 | 1 |

// at the beginning of load_1 execution, rotate and release register 0

| | | | | | |
|---|---|---|---|---|---|
| store_2 | load_1 | 0 (P, ROT 1) | 0 | 0 | - |
| load_3 | store_0 | 0 (C) | 1 | 1 | 1 |

Data dependences: store_0 → load_1, store_2 → load_3
Checking constraints: store_0 ⇒$_c$ load_1, store_2 ⇒$_c$ load_3

In the scheduled code, for instruction n with register ORD(n), P(n), C(n), ROT(n) and register count REG, we get:

$$\text{valid\_all}(n) = 0 \qquad \text{if } n = 0$$
$$= (\text{valid\_all}(n-1) \,|\, (1 \ll \text{ORD}(n-1))) \gg \text{ROT}(n) \qquad \text{if } n > 0 \text{ and } P(n-1)$$
$$= \text{valid\_all}(n-1) \gg \text{ROT}(n) \qquad \text{otherwise}$$

$$\text{valid\_st}(n) = 0 \qquad \text{if } n = 0$$
$$= (\text{valid\_st}(n-1) \,|\, (1 \ll \text{ORD}(n-1))) \gg \text{ROT}(n) \qquad \text{if } n > 0, n-1 \text{ is a store and } P(n-1)$$
$$= \text{valid\_st}(n-1) \gg \text{ROT}(n) \qquad \text{otherwise}$$

$$\text{AHPTR}(n) = 0 \qquad \text{if } n = 0$$
$$= (\text{AHPTR}(n-1) + \text{ROT}(n)) \,\%\, \text{REG} \qquad \text{if } n > 0$$

FIG. 2F

```
Schedule() {
    Compute data dependences A1 → A2
    regs = 0;
    Repeat until all instructions are scheduled {
        Schedule an instruction A2 with certain instruction schedule algorithm
        For all the data dependences A1 → A2 {
            If (A1 has not scheduled yet) {      // A2 is speculatively moved above A1
                Add A1 ⇒_c A2                    // add a checking constraint
                C(A1) = 1, P(A2) = 1;            // set C, P bits
            }
            If(P(A1) && C(A2) && !R(A1))         // only when A1 is delayed for allocation
                Add A1 ⇒_ac A2                   // add anti-checking constraint
        }

// release all register allocated by last scheduled instruction
        ROT(A2) = regs;                          // rotate to release registers
        AHPTR = AHPTR + regs;                    // update AHPTR // record AHPTR at the instruction execution for delayed register allocation
        AHPTR_AT(A2) = AHPTR;                    // This assumes a list scheduler // allocate register
        regs = alloc_register(A2, 0)             // allocate register for A2
    }
} alloc_register(A2, regs) {
    If (exist * ⇒_c A2 or * ⇒_ac A2)             // exist checking and anti-checking constraint
        return regs;                             // delay register allocation for A2
    if(P(A2))
        // compute ORD as relative to ATHPTR_AT(A2)
        ORD(A2) = (regs++) + AHPTR − AHPTR_AT(A2);
    else if(C(A2))
        ORD(A2) = regs + AHPTR − AHPTR_AT(A2);
    R(A2) = 1;                                   // mark A2 as allocated
    For all A2 ⇒_c A3 or A2 ⇒_ac A3 {
        remove A2 ⇒_c A3 or A2 ⇒_ac A3           // remove constraint
        regs = alloc_register(A3, regs);         // recursive allocate register for A3
    }
    return regs;
}
```

FIG. 2G

282
Store-load elimination:
    Store_1 [m], r1                  store_1 [m], r1      (fused with load_2)
    ...memop...    →                      ...memop...
    Load_2 [m], r2   284         mov r2 ← r1

Load-load elimination
    Load_1 [m], r1                 load_1 [m], r1      (fused with load_2)
    ...memop...    →                      ...memop...
    Load_2 [m], r2   286         mov r2 ← r1

Store-store elimination
    Store_1 [m], r1
    ...memop...    →                      ...memop...
    Store_2 [m], r2                store_2 [m], r2      (fused with store_1)

FIG. 2H

| original code (210) | optimized and scheduled code (222) | register ORD and P/C bits (232) | valid_all (240) | valid_st (250) | mask (260) |
|---|---|---|---|---|---|
|  |  | AHPTR=0 |  |  |  |
| store_0 | load_1 | 1 (P) | 00 | 00 | - |
| load_1 | store_0 (load_3) | 0 (P/C) | 10 | 00 | 10 |
| store_2 | store_2 | 0 (C) | 11 | 00 | 11 |
| load_3 |  |  |  |  |  |

Data dependences: store_0 → load_1, store_0 → store_2, store_2 → load_3

After optimization and scheduling
Checking constraints: store_2 ⇒$_c$ store_0 (load_3) ⇒$_c$ load_1

FIG. 2I

| original code | optimized and scheduled code | register ORD and P/C bits | valid_all | valid_st | mask |
|---|---|---|---|---|---|
| | | AHPTR=0 | | | |
| store_0 | load_1 | 0 (P) | 00 | 00 | - |
| load_1 | store_0 (load_3) | 0 (C) | 01 | 00 | 01 |
| store_2 | dummy_load | 1 (P) | 01 | 00 | - |
| load_3 | store_2 | 1 (C) | 11 | 00 | 10 |

Data dependences: store_0 → load_1, store_0 → store_2, store_2 → load_3, load_1 → store_2

After optimization and scheduling
Checking constraints: store_0 ⇒$_c$ load_1, store_2 ⇒$_c$ dummy_load
Anti-checking constraints: load_1 ⇒$_{ac}$ store_2

FIG. 2J

```
schedule() {
    Compute data dependences A1 → A2
    Reserve register count for all fused instructions
    regs = 0;
    Repeat until all instructions are scheduled {
        Select an instruction A2 for schedule with certain instruction schedule algorithm
        If A2 need a new register and may run out of register
            Continue to select a different instruction for schedule
        For all the data dependences A1 → A3,
                    A3 = A2 or A3 ∈ A2 {   // A2 may be a fused instruction
            If (A1 has not scheduled yet) {
                Add A1 ⇒_c A3              // add checking constraint
                C(A1) = 1, P(A3) = 1;      // set C, P bit
            }
            If(P(A1) && C(A3) && !R(A1))
                Add A1 ⇒_ac A3             // add anti-checking constraint
        }
        If A2 is a fused instruction {
            Remove unnecessary C / P bit
            If A2 has C/P bits on multiple logical instructions
                Add dummy memory instructions to partition the C/P bits
        }
        ROT(A2) = regs;                    // rotate to release registers
        AHPTR = AHPTR + regs;              // update AHPTR
        AHPTR_AT(A2) = AHPTR;              // This assumes a list scheduler
        regs = alloc_register(A2, 0);      // allocate register for A2
    }
}
alloc_register(A2, regs) {
    If (exist * ⇒_c A2 or * ⇒_ac A2)      // exist checking and anti-checking constraint
        return regs;                       // delay register allocation for A2
    if(P(A2))
        ORD(A2) = (regs++) + AHPTR − AHPTR_AT(A2);
    else if(C(A2))
        ORD(A2) = regs + AHPTR − AHPTR_AT(A2);
    R(A2) = 1;
    For all A2 ⇒_c A3 or A2 ⇒_ac A3 {
        remove A2 ⇒_c A3 or A2 ⇒_ac A3    // remove constraint
        regs = alloc_register(A3, regs);   // recursive allocate register for A3
    }
    return regs;
}
```

FIG. 2K

REGISTER ALLOCATION FOR ROTATION BASED ALIAS PROTECTION REGISTER

BACKGROUND

Hardware/Software co-designed systems may leverage dynamic binary optimization to improve performance. For dynamic binary optimization on memory instructions, memory alias information may be required. Dynamic binary optimization may leverage hardware alias checking for speculative memory optimization in an atomic region. When a load instruction is speculatively reordered before a store instruction with possible memory alias between them, the load instruction may need to set up an alias protection register with its memory address stored in it. In response to the store instruction being executed, the store instruction may check against the alias protection register with its memory address to detect mis-speculations. Mis-speculations may lead to the rollback of the whole region and re-execution of non-optimized or less-optimized code.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 2A-2K are schematic diagrams of register allocation in rotation based alias protection register according to some embodiments of the invention.

DETAILED DESCRIPTION

The following description describes techniques to provide alias register allocation algorithms to reduce register usage in rotation-based alias protection register. The implementation of the techniques is not restricted in computing systems; it may be used by any execution environments for similar purposes, such as, for example, any other digital/electronic device. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures and full software instruction sequences have not been shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The following description may include terms, such as first, second, etc. that are used for descriptive purposes only and are not to be construed as limiting.

Figure 1A:
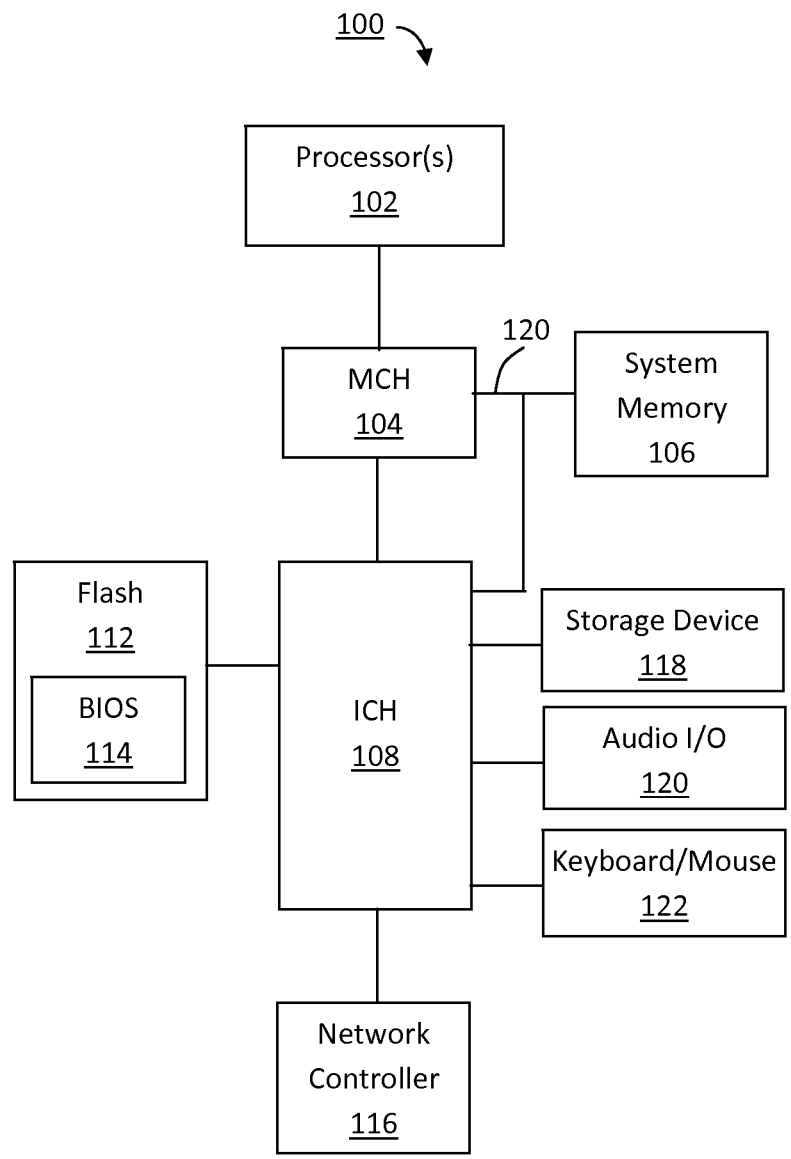
FIG. 1A is a block diagram of an exemplary system according to an embodiment of the invention.

FIG. 1A illustrates a block diagram of an exemplary embodiment of a system 100. The system 100 may comprise a processor 102. Processor 102 may comprise any type of processors capable of executing software and/or process data signals. In an embodiment, processor 102 may comprise a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor such as a microprocessor, digital signal processor or microcontroller.

Although FIG. 1A shows only one such processor 102, there may be one or more processors in the system 100 and one or more processors may include multiple threads, multiple cores, or the like. The present enhancement is not limited to computing systems. Alternative embodiments of the present invention can be used in any form factor devices that uses unified extensible firmware interface (UEFI) Basic Input/Output System (BIOS), such as handheld devices and embedded applications. Some examples of handheld devices include cellular phones, Internet Protocol devices, digital cameras, personal digital assistants (PDAs), or handheld PCs such as netbook or notebook. Embedded applications can include a micro controller, a digital signal processor (DSP), system on a chip, network computers (NetPC), set-top boxes, network hubs, wide area network (WAN) switches, or any other system.

The processors 102 may be coupled to a system logic chip 104. For example, the system logic chip 104 in the illustrated embodiment may be a memory controller hub (MCH). In one embodiment, the MCH 104 may provide a memory path 120 to system memory 106 for instruction and data storage and/or for storage of, e.g., graphics commands, data and textures. The memory path 120 may comprise a memory bus. The MCH 104 may direct data signals between processor 102, system memory 106, and other components in the system 100 and bridge the data signals between processor 102, system memory 106, and system I/O. Memory 106 may be a hard disk, a floopy disk, random access memory (RAM), read only memory (ROM), flash memory, or any other type of medium readable by processor 102.

MCH 104 may be coupled to an I/O controller hub (ICH) 108 via a local I/O interconnect. In an embodiment, the local I/O interconnect may be a high-speed I/O bus, such as peripheral component interconnect (PCI) bus. ICH 108 may provide connections to one or more I/O devices, e.g., via a local I/O interconnect. Some examples may comprise data storage device 118, audio I/O 120, keyboard/mouse I/O 122, and a network controller 116, or other integrated I/O components such as integrated driver electronics (IDE), local area network (LAN) and serial expansion port such as universal serial bus (USB), PCI slots (not shown), wireless transceiver, legacy I/O controller or the like. The data storage device 118 may comprise a hard disk drive, a floppy disk drive, a CD-ROM device, a flash memory device, or other mass storage device.

Referring to FIG. 1A, non-volatile memory, such as flash memory 112, may be coupled to ICH 108 via, e.g., a low pin count (LPC) bus. The BIOS firmware 114 may reside in flash memory 112 and boot up may execute instructions from the flash memory, or firmware. Although FIG. 1A illustrates BIOS firmware 114 in flash memory 112, in some embodiments, BIOS firmware 114 may be stored in other non-volatile memory such as a firmware hub, or the like. In an embodiment, BIOS firmware 114 may be implemented by Unified Extensible Firmware Interface (UEFI) firmware or any other firmware.

Although FIG. 1A illustrates the system 100, the embodiments according to the invention may be used in any other hardware architecture such as a platform using a plurality of processor cores or a platform using a processor or a coprocessor, a platform using I/O hubs, or memory control embedded within the processors, or the like, may be used.

Figure 1B:
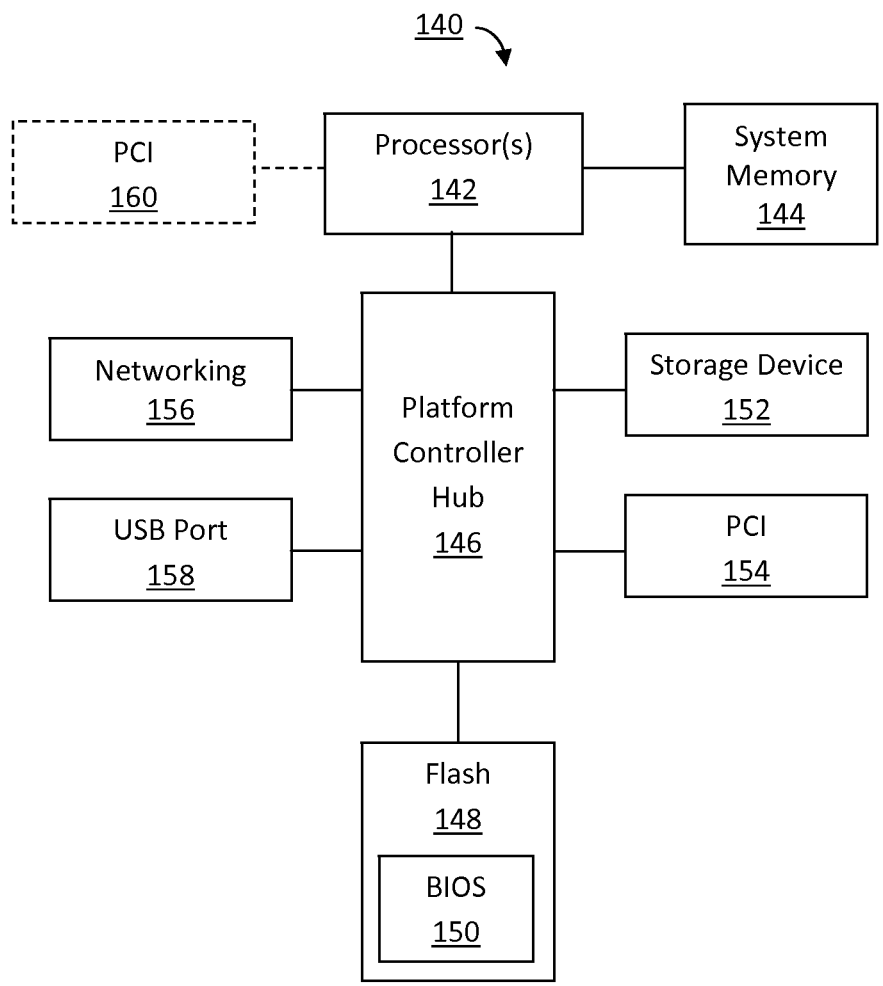
FIG. 1B is a block diagram of another exemplary system according to an embodiment of the invention.

FIG. 1B illustrates an alternative embodiment of a system 140 which implements the principles of the present invention. The system 140 may comprise a processor 142. The processor 142 may comprise any type of processors capable of executing software and/or process data signals. In an embodiment, processor 142 may comprise any type of processors or processor devices as mentioned above with regard to processor 102. In an embodiment, processor 142 may be coupled to system memory 144 via a memory path (not shown) for instruction and data storage and/or for storage of, e.g., graphics commands, data and textures. In another embodiment, processor 142 may be coupled to one or more peripheral component interconnect (PCI) ports 160 via a PCI interconnect; however, in some embodiment, the PCI ports 160 may not be required. Memory 144 may be a hard disk, a floopy disk, random access memory (RAM), read only memory (ROM), flash memory, or any other type of medium readable by processor 142.

Although FIG. 1B shows only one such processor 142, there may be one or more processors in the system 140 and one or more processors may include multiple threads, multiple cores, or the like. The present enhancement is not limited to computer systems or data processing device systems. Alternative embodiments of the present invention can be used in any form factor devices that uses unified extensible firmware interface (UEFI) Basic Input/Output System (BIOS), such as handheld devices and embedded applications. Some examples of handheld devices include cellular phones, Internet Protocol devices, digital cameras, personal digital assistants (PDAs), handheld PCs such as netbook or notebook, or smart devices such as tablets or smart phones or the like. Embedded applications can include a micro controller, a digital signal processor (DSP), system on a chip, network computers (NetPC), set-top boxes, network hubs, wide area network (WAN) switches, or any other system.

The processors 142 may be coupled to a system logic chip 146. For example, the system logic chip 146 in the illustrated embodiment may be a platform controller hub (PCH). In one embodiment, PCH 146 may provide connections to one or more I/O devices, e.g., via a local I/O interconnect. In an embodiment, the local I/O interconnect may be a high-speed I/O bus, such as peripheral component interconnect (PCI) bus. PCH 146 may direct data signals or other information between processor 142 and one or more other components in the system 140 and bridge the data signals or information between processor 142 and system I/O.

Some examples of the one or more components may comprise data storage device 142, one or more PCI port 154, networking control 156, USB port 158. In one embodiment, data storage device 152 may comprise a hard disk drive, a floppy disk drive, a CD-ROM device, a flash memory device, or other mass storage device. Although FIG. 1B shows some examples of the components, PCH 146 may provide connections to any other components, such as audio I/O, keyboard/mouse I/O, and other integrated I/O components such as integrated driver electronics (IDE), local area network (LAN) and other serial expansion port, wireless transceiver, legacy I/O controller or the like.

Referring to FIG. 1B, non-volatile memory, such as flash memory 148, may be coupled to PCH 146 via, e.g., a low pin count (LPC) bus. BIOS firmware 150 may reside in flash memory 148 and boot up may execute instructions from the flash memory, or firmware. Although FIG. 1B illustrates BIOS firmware 150 in flash memory 148, in some embodiments, BIOS firmware 150 may be stored in other non-volatile memory such as a firmware hub, or the like. In an embodiment, BIOS firmware 150 may be implemented by Unified Extensible Firmware Interface (UEFI) firmware or any other firmware.

Although FIG. 1B illustrates the system 140, the embodiments according to the invention may be used in any other hardware and software architecture such as a platform using a plurality of processor cores or a platform using a processor or a coprocessor, a platform using I/O hubs, or memory control embedded within the processors, or the like, may be used.

Figure 1C:
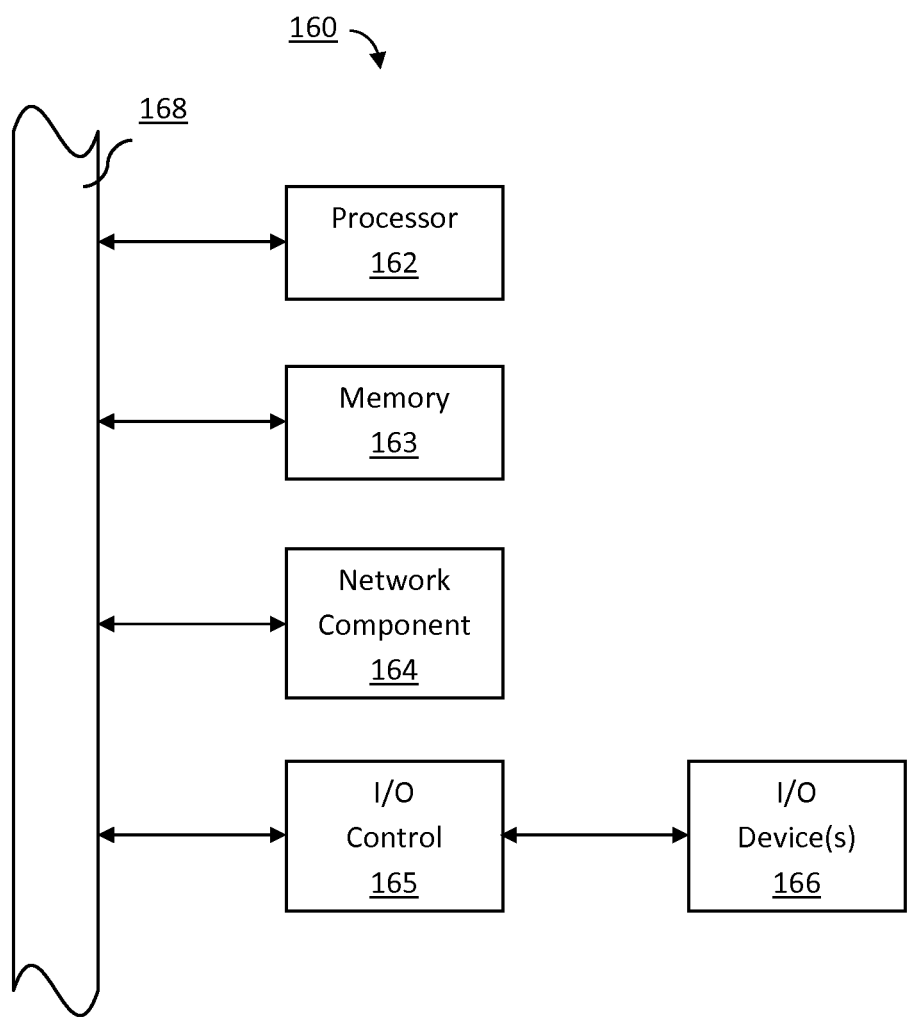
FIG. 1C is a block diagram of yet another example system according to an embodiment of the invention.

FIG. 1C illustrates another embodiment of a system 160 that may implement the principles of the present invention. The system 160 may comprise a processor 162. The processor 162 may comprise any type of processors capable of executing software and/or process data signals. The processor 162 may comprise any type of processors or processor devices as mentioned above with regard to processor 102. The system 160 may comprise a memory 163 that may couple to the processor 162 via an interconnect 168 or any other connection such as bus, memory path, etc. Examples of memory 163 may comprise a hard disk, a floopy disk, random access memory (RAM), read only memory (ROM), flash memory, volatile memory devices or non-volatile memory devices, or any other type of medium readable by processor 162. In another embodiment, processor 162 may be coupled to a network component 164 that may comprise, e.g., wired network connection and/or wireless network connection or any other network connection. Processor 162 may be further coupled to a I/O controller 165 that may be coupled to one or more I/O devices 166. FIG. 1C illustrates an embodiment of the system 160; in some embodiments, the system 160 may comprise one or more other components that may be implemented in hardware, software, firmware or any combination of them. In another embodiment, examples of the system 160 may comprise any form factor devices or apparatus as mentioned above with regard to FIG. 1A or 1B.

FIG. 2A is a schematic diagram according to an embodiment of the invention. Reference number 210 may refer to original codes or instructions that may have an order of store_0, store_1, and so on as shown in FIG. 2A. In one embodiment, the original codes may be within an atomic region; however, in some embodiment, the atomic region may not be necessary. In one embodiment, original codes 210 may be reordered or scheduled to scheduled codes or instruction 220 that may have a different sequence or order with regard to original codes. For example, instruction 220a may refer to a memory store instruction store_5 that may be scheduled to the first instruction to be executed by, e.g., an execution logic. The embodiment of FIG. 2A may use rotation-based alias protection registers that may allow each memory instruction to set up an alias protection register and check against a set of alias protection registers with a bit mask.

In one embodiment, a rotation-based alias checking may be utilized. The alias protection registers may be organized in a circular buffer or a circular queue rotated based on AHPTR (Alias Head Pointer) 270 that may point to a head of the circular buffer. A memory instruction may specify an alias protection register number ORD 230 relative to current AHPTR 270 (with possible wrapping around). For example, referring to FIG. 2A, based on an order of the original codes, a first alias protection register with the register ORD of "0" for the first instruction store_0 may be set up at the head of the circular buffer, the second instruction store_1 may specify a second alias protection register with the register ORD of "1", and so on. In another embodiment, a memory instruction may have a P bit to indicate that hardware such as processor 102 or 142 or any other execution logic may set up an alias protection register with register number AHPTR+ORD for the current instruction. In one embodiment, registers in range of [AHPTR+ORD, AHPTR) may be checked against. For example, if AHPTR=2, ORD=1 and the total register number is 5 (e.g., 0-4), register 3, register 4, register 0 and register 1 in the range of [3, 2) may be checked. In one embodiment, wrapping around may be used.

A memory instruction may have a C bit to indicate that hardware such as a processor or any other execution logic may check against all the alias protection registers with register number>=AHPTR+ORD (with possible wrapping around). In response to instruction scheduling, alias protection registers with number ORD 230 may be allocated for the scheduled instructions based on an original execution order of the instructions. For example, in FIG. 2A, alias protection registers with ORD 230 may be allocated as the order in the original program execution.

In another embodiment, a memory instruction may specify a rotation number ROT that may indicate the alias head pointer may to be rotated by an amount indicated in the ROT. In one embodiment, the rotation value ROT may be used to indicate that all the alias protection registers between AHPTR and AHPTR+ROT (with possible wrapping around, including AHPTR, excluding AHPTR+ROT) may be released, e.g., before execution of an instruction. In one embodiment, hardware such as processor 102 or 142 may rotate AHPTR by ROT and clear all the valid bits for the alias protection registers between AHPTR and AHPTR+ROT.

In one embodiment, in response to setting up an alias protection register with a P bit, the hardware may set a valid bit for the register. For example, a valid bit with, e.g., a logical "1" may represent a valid alias protection register that may be checked against by, e.g., the hardware. In another embodiment, a valid bit with a logical value, e.g., "0", may indicate that the corresponding alias protection register may not be checked against. For example, numerical reference 240 of FIG. 2A may refer to "valid_all" that may comprise a set of one or more valid bits for a set of one or more alias protection registers. In one embodiment, the number of valid bits in "valid_all" 240 may be the same as the number of alias protection registers and/or the number of scheduled instructions; however, in some embodiments, the number of valid bits may be different from the number of scheduled instructions. For example, based on the order of original codes, the valid bit for the alias protection register with ORD of "5" for a last instruction store_5 may be set at a highest-order bit of valid_all 240, and the valid bit for the alias protection register with ORD of "0" for the first instruction store_0 may be set at a lowest-order bit of valid_all 240 and so on; however, in some embodiments, the valid bits in valid_all 240 may be provided in a different order. In some embodiments, the valid bits in valid_all 240 may have an order based on the ORD for the alias protection registers.

For example, valid_all field 240a may be "000000" that may represent none of the alias protection registers may be checked against for instruction "store_5" that is the first instruction in the scheduled sequence. The valid_all field 240b may relate to a subsequent instruction "store_2" in the scheduled codes. The valid_all field 240b may be "100000", wherein the valid bit "1" may correspond to the previous instruction "store_5" and may indicate that the alias protection register for "store_5" may be checked against. And, the valid bits "00000" in 240b may indicate that the alias protection registers for store_2 itself, store_0, load_4, store_1, load_3 may not be checked against.

Referring to FIG. 2A, valid_st field 250 may relate to a store instruction and may comprise a set of one or more valid bits. For example, valid_st 250 may be different from valid_all 240 in that a valid bit for an alias protection register for a load instruction may have a logical value of "0" in valid_st 250. In one embodiment, the hardware such as 102 or 142 or other execution logic may maintain the valid bits for, e.g., all the alias protection registers and compute the bit mask 260 for checking before execution of each instruction. A load instruction may not check against another load instruction. As seen from the bit mask 260a for load_3, there may not be valid bit (e.g., logical value "1") for load_4 or the valid bit for the alias protection register of load_4 may not be asserted. In another embodiment, for the bit mask 260a for load_3, there may not be valid bits for store_0, store_1, and store_2 that are ordered before load_3 in an original execution order. The hardware may maintain separate valid bits for all instructions (e.g., valid_all 240) and for store instructions only (e.g., valid_st 250). Store instructions may check against valid_all 240 and load instructions may only check against valid_st 250.

FIG. 2A illustrates an embodiment of a formula for hardware such as a processor or any other execution logic to maintain valid_all 240, valid_st 250 and compute the mask 260 based on ORD 230, e.g., in C language semantics. The algorithm for register allocation for rotation-based alias protection registers of FIG. 2A may allocate a register for each instruction in their original program order, shown as "register ORD" 230 such as 230a as shown in FIG. 2A. The algorithm may be used to guarantee no false negative or false positive in alias checking. Referring to FIG. 2A, in one embodiment, each instruction may have a P/C bit (not shown) but may not have a ROT. In yet another embodiment, hardware such as a processor or any other execution logic may run the scheduled code 220 with ORD/P/C 230 and compute valid_all 240, valid_st 250 and valid_mask 260 to do alias checking.

Referring to FIG. 2B, an embodiment of register allocation is illustrated. In one embodiment, the register allocation of FIG. 2B may be used to reduce a number of alias protection registers used in rotation-based alias protection register scheme and may not generate false positive or false negative. Embodiment of FIG. 2B may be integrated with the instruction scheduling and optimizations and may be used for dynamic optimizations. In one embodiment, not every memory instruction may set up an alias protection register and not every memory instruction may check against other alias protection registers. For example, in FIG. 2B, none of store_0, store_1 and load_3 may set up an alias protection register, because no instruction may check against them. Store_5 may not check against any other alias protection registers because it is scheduled to be the first instruction in the region. The embodiment of FIG. 2B may utilize three registers instead of six registers.

Referring to FIG. 2B, store_5, store_2 and load_4 may need protection (e.g., their P bit may be set to 1 and their C bit (not shown) may be set to 0) and they may be assigned a register with ORD number 2, 0, and 1, respectively. Store_0, store_1 and load_3 may not need protection and may only check against other alias registers (e.g., their P bits may be set to 0 and their C bit may be set to 1). FIG. 2B illustrates an embodiment to compute valid_all 240, valid_st 250 and mask 260 based on ORD, P and C shown as "232" in FIG.2B.

FIG. 2C shows another embodiment of register allocation. In the embodiment of FIG. 2C, in response to determining store_1 and load_4 may not access the same memory, e.g., by software analysis, store_1 may not check against load_4. The embodiment of FIG. 2C may use two registers. Referring to FIG. 2C, store_5, store_2 (e.g., their P bit=1) may be protected and they may be assigned registers with ORD 1, and 0, respectively. Store_0, load_4, store_1 and load_3 (e.g., their P bits=0 and C bit=1) may only check against other alias registers. In the embodiments of FIGS. 2A to 2C, the register allocation may follow an original program order. For example, if a first instruction is to be executed before a second instruction in original program, the register number for the first instruction may be no larger than the second instruction.

FIG. 2D illustrates yet another embodiment of register allocation. Referring to FIG. 2D, an embodiment of a data dependence is shown. For example, dependence A1→A2 may be defined, if 1) instruction A1 is to be executed before instruction A2 in original program order; 2) A1 and A2 may access the same memory; 3) at least one of A1 and A2 is a store instruction. FIG. 2D further shows an embodiment of checking constraint. For example, in response to, e.g., instruction scheduler speculating that A1 and A2 may not conflict at runtime, the instruction scheduler may move A2 before A1. For example, the instruction scheduler may be implemented by software. If A1→A2 and instruction A2 is reordered to before A1, A2 may set up an alias protection register to be checked against by A1. A checking constraint A1⇒ A2 may be defined, if 1) A1→A2; 2) A2 is reordered to before A1 by scheduling. In one embodiment, instruction A1 may check against instruction A2 in response to A1⇒ c A2. In some embodiments, checking constraint may not be transitive. For example, A1⇒c A2 and A2⇒A3 may not imply A1⇒c A3.

In one embodiment, checking constraints A1⇒ c A2 may determine which instruction may set up an alias protection register and which instructions may check against other instructions. For example, the checking constrain A1⇒ c A2 may determine instruction A2 may set up a new alias protection register with P bit and instruction A1 (with C bit) may check against instruction A2. FIG. 2D illustrates an embodiment of register allocation in the original program order. For example, as shown in FIG. 2D, load_1 and load_3 may set up new alias protection registers with P bit based on the corresponding checking constraints and/or data dependences as shown in FIG. 2D. Register 0 and 1 may be allocated to load_and load_3, respectively, according to their original program order. Store_2 may check against the register 1 of instruction load_3 that is scheduled before store_2. Store_0 may check against the register 0 of instruction load_1 that is scheduled before store_0. In the embodiment of FIG. 2D, there may not be checking constraint store_0⇒c load_3 (e.g., store_0 may not access same memory with load_3) and store_0 may not need to check against load_3.

FIG. 2E illustrates an embodiment of register allocation not in original program order. For example, referring to FIG. 2E, register 0 and 1 may be allocated to load_3 and load_1, respectively, in an order opposite to their original program order. Referring to FIG. 2E, register 0 for Load_3 (ORD 0/P) may only be checked by Store_2 (ORD 0/C). In the embodiment of FIG. 2E, after Store_2, register 0 may not be checked against. Referring to FIG. 2F, AHPTR may be rotated by ROT "1" to release register 0. For example, register 0 may be rotated and released at the beginning of execution of load_1; however, in some embodiments, the register 0 may be released, e.g., in response that the register may have been checked against and may not be used by any other instruction. In another embodiment, the rotation may be performed after the execution of the store_2. In response to the rotation, AHPTR may be increased by 1 (e.g., current AHPTR=1). The ORD may still be "0" for a subsequent instruction as counted relative to the current AHPTR. FIG. 2E and FIG. 2F may do the same alias checking. For example, FIG. 2F may reduce the register number to 1 register with the rotation.

In the embodiment of register allocation with rotation of FIG. 2F, the register 0 used by load_3 may be released by register rotation in response to store_2 having checked against register 0. In this embodiment, one register may be used. FIG. 2F shows an embodiment to compute valid_all, valid_st and mask based on ORD, P, C, ROT and register count REG (e.g., 1). In one embodiment, valid_all, valid_st and mask in the formula may be computed as relative to AHPTR. For example:

$$mask(n) = valid\_all(n) \& \sim((1 << ORD(n)) - 1),$$

$$\text{if } n \text{ is a store and } C(n);$$

$$= valid\_st(n) \& \sim((1 << ORD(n)) - 1),$$

$$\text{if } n \text{ is a load and } C(n).$$

In one embodiment, hardware may circularly left shift the mask by AHPTR for checking. In one embodiment, "circularly left shift" may shift the bits in the mask to left and wrap around overflow bit to the right. For example, with mask 00001111, circularly left shift by 2 may result in 00111100. In the embodiment of FIG. 2F, the valid_all, valid_st, and mask may be calculated as relative to AHPTR. For example, if AHPTR=2, mask 00001111 may indicate register 2 to register 5 have a mask value "1" and register 6,7,0,1 may each have a mask value "0".

The embodiment of FIG. 2G may be used to provide register allocation based on both checking constraint and anti-checking constraint integrated with the instruction scheduling. In one embodiments, if A1⇒ c A2, the register for A1 may be no larger than that A2 in order for A1 to check against A2. In some embodiment, checking constraint and anti-checking constraint may be used in register allocation to avoid false positive in the alias checking. In one embodiment, an anti-checking constraint A1⇒ac A2 may be defined, if 1) A1→A2; 2) A1 may set up an alias protection register based on a checking constraints A0⇒c A1; 3) A2 may check against some alias protection registers based on a checking constraint A2⇒c A3; and 4) scheduling may not reorder A2 before A1.

In one embodiment, based on anti-checking constraint A1⇒ac A2, the register number for A1 may be smaller than A2 to prevent A2 from checking against A1 (e.g., to avoid possible false positive). Checking constraints may be used to reduce or minimize constraints in register allocation, e.g., to prevent false negative in the checking, and anti-checking constraints may be used to reduce/minimize additional constrains in register allocation, e.g., to prevent false positive in the checking.

The embodiment of FIG. 2G may be used to dynamically restrict scheduling when running out of alias registers. Referring to FIG. 2G, the checking constraints and anti-checking constraints may be built incrementally during the scheduling. The register for an instruction may be allocated only in response to the instruction is scheduled. If A1⇒c A2 or A1⇒c A2, the register allocation for A2 may be delayed until the registers for A1 are allocated. In the embodiment of FIG. 2G, P(A), C(A), ORD(A) and ROT(A) may respectively represent the P bit, C bit, ORD and ROT for an instruction A. In one embodiment, an optimizer/scheduler may be used to keep track of AHPTR change that may happen during the execution of one or more instructions, e.g., during the scheduling. In one embodiment, the optimizer/scheduler may be implemented, e.g., by software. For example, AHPTR_AT(A) may record the AHPTR at the execution of instruction A for the delayed register allocation. R(A) may represent whether the register for A is allocated or not. In the embodiment of FIG. 2G, a register allocation for an instruction may be delayed after all the instructions that check the instruction are scheduled (e.g., based on checking constraints). In one embodiment, one or more allocated registers may be released, e.g., after the corresponding scheduled instruction (e.g., only in beginning of next scheduled instruction). Although the embodiment of FIG. 2G may utilize a list scheduling, some embodiments may be extended to work with any other scheduling techniques such as modulo scheduling.

Referring to FIG. 2G, the embodiment of register allocation that may be integrated with instruction scheduling. In one embodiment, the embodiment may check whether it is run out of registers (e.g., ORD(A)>=REG). Referring to FIG. 2G, ORD(A) may relate to three variables, REG that may represent a register count, AHPTR and AHPTR_AT(A). AHPTR may always be available. The variable 'REG' may be bounded by a number of instructions with P(A)=1 and !R(A), wherein P(A) may represent that instruction A may need a new register to set up protection and !R(A) may represent that the register for instruction A has not been allocated yet. For example, the variable 'REG' may be bounded by a number of instructions that their register allocations are delayed. In one embodiment, AHPTR may keep increasing in the scheduled order. AHPTR_AT(A) may record the AHPTR at the execution of instruction A for delayed register allocation. In one embodiment, the delayed register allocations may be counted to prevent register overflow.

In one embodiment, an optimizer/scheduler may keep track of the information such as the variables REG, AHPTR, AHPTR_AT during scheduling to estimate whether there is one or more alias protection register to be allocated to a scheduled instruction or it is run out of registers. In one embodiment, in response to running out of register, reordering of any new instruction A (i.e. P(A)=1) may be prevented.

In one embodiment, the remaining instructions may be scheduled in their original execution order to avoid the reordering.

FIG. 2H illustrates an embodiment to handle memory optimizations that may use alias registers. The optimization may be speculative if the second memory operation may be conflict with some memory operation between them. For example, speculative memory optimization may use alias register protection and check. The optimizations may be applied before instruction scheduling and alias registers allocation may be performed during instruction scheduling: however, in some embodiment, instruction optimization may not be necessary. In response to the optimization and during scheduling, the optimized code may be logically viewed as fusing eliminated instructions into other instructions, and the fused instruction/codes may be used for alias checking on all the eliminated instructions. Referring to FIG. 2H, in the embodiment of store-load elimination 282, the code may be logically viewed as fusing load_2 into store_1. In load-load elimination 284, the code may be logically viewed as fusing load_2 into load_1. In the store-store-elimination 286, the code may be logically viewed as fusing store_1 into store_2. In one embodiment, the fused instruction may contain one or more logical instructions/codes.

During the scheduling for the fused instruction, the constraints on the logical instructions in the fused instruction may be considered. For example, in the code shown in FIG. 2I, store-load-elimination may be applied from store_0 to load_3. After the optimization and in the scheduling, the constraints on both store_0 and load_3 may be considered when scheduling store_0. The register allocation is shown in FIG. 2I. Referring to FIG. 2I, in optimization, Store_2 may check Load_3 and Store_0 may check Load_1. In response to Load_3 and Store_0 being merged into Store_0, Store_2 may check Store_0 and Store_0 may check Load_1. Store_0 and Load_1 may need protection (P bit=1) and may be assigned register 0, 1. Store_2 and Store_0 may check (C bit=1) against register 0. Store_0 may check register 0 before setting protection (P bit=1) and thus Store_0 may not check itself.

In some embodiment, the fused instructions may contain cycles in data dependences, which may lead to cycles in the checking/anti-checking constraints. For example, a cycle in checking/anti-checking constraints may be represented as: store_0 (load_3)⇒c load_1⇒ac store_2⇒c store_0 (load_3). In one embodiment, allocating alias protection registers may lead to false negative and false positive if the checking/anti-checking constraints contain cycles.

FIG. 2J shows an embodiment to insert a dummy load to break the constraint cycle. Referring to 2J, in one embodiment, fused instructions may use one or more alias protection registers to break constraint cycles. In another embodiment, a dummy memory instruction may be inserted immediately after the fused instruction that may access the same memory as fused instruction but may use different alias protection register with regard to the fused instruction. In one embodiment, the hardware may implement the dummy memory instructions to perform only the alias protection/check without actual memory access to reduce overhead.

In one embodiment, a dummy memory operation may be inserted when constraint cycle is about to happen if constraint cycle may not happen frequently. For example, during the scheduling, information on P/C bit for each logical instruction in a fused instruction may be tracked. Dummy memory instructions may be inserted to partition the P/C bits, in case the P/C bits are on one or more logical instructions in a fused instruction. In some embodiments, setting P/C bit on one or more logical instructions in a fused instruction may be avoided if the one or more logical instructions in a fused instruction access the same memory. For example, in the load-load elimination cases shown in FIG. 2H, the C bit on Load_2 may not be set in response to that the instructions checked by Load_2 may always be checked by Load_1. Similarly, P bit on Load_1 may not be set in response that the instructions that check Load_1 may always check Load_2. In one embodiment, C/P bit on at most three logical instructions may be kept, such as the earliest instruction with C bit, the latest instruction with P bit and the latest store with P bit, no matter how many logical instructions are merged into a fused instruction. The embodiment of FIG. 2J illustrates an example of using dummy memory instructions to break the cycle.

In some embodiments, dummy memory instructions may break the cycle, but may not remove the checking/anti-checking constraints. The scheduling of dummy memory instruction may not be performed in case of the cycle in response that alias protection registers may not be enough for the schedule. For example, in the schedule shown in FIG. 2J, in response that there is no alias protection register after scheduling load_1, either store_0 or store_2 may not be scheduled if at least one more alias protection register may be needed for either of the scheduling. The embodiment of FIG. 2J may illustrate that if store_0 is to be scheduled, a new alias protection register may be needed for dummy_load that is to be checked by store_2. If store_2 is to be scheduled, a new alias protection register may be needed for store_2 that may be checked against by store_0 (load_3). In one embodiment, the scheduling of store_2 may be executed based on availability of the new alias protection register for store_2. For example, store_2 may not be scheduled in response to determining that the new alias protection register for store_2 may be absent or may not be available.

In one embodiment, a number of alias registers may be reserved. For example, the number may equal to a number of eliminated instructions in fused instructions. If all the remaining instructions are scheduled in their original order (for fused instruction, order of its first logical instruction), only the reordered logical instructions may use additional alias registers. With the alias register reservation, the scheduling shown as "222" in FIG. 2J may be performed without running out of registers.

FIG. 2K depicts an embodiment of an algorithm that may extend the register allocation in FIG. 2G to handle register overflow and constraint cycles. Referring to FIG. 2K, the embodiment may reserve a register count for all fused instructions. In one embodiment, the alias registers by the number of eliminated instructions in fused instructions may be reserved to avoid running out of registers. In another embodiment, if all the remaining instructions are scheduled in their original order (for fused instruction, order of its first logical instruction), only the reordered logical instructions may need additional alias registers.

Figure 3:
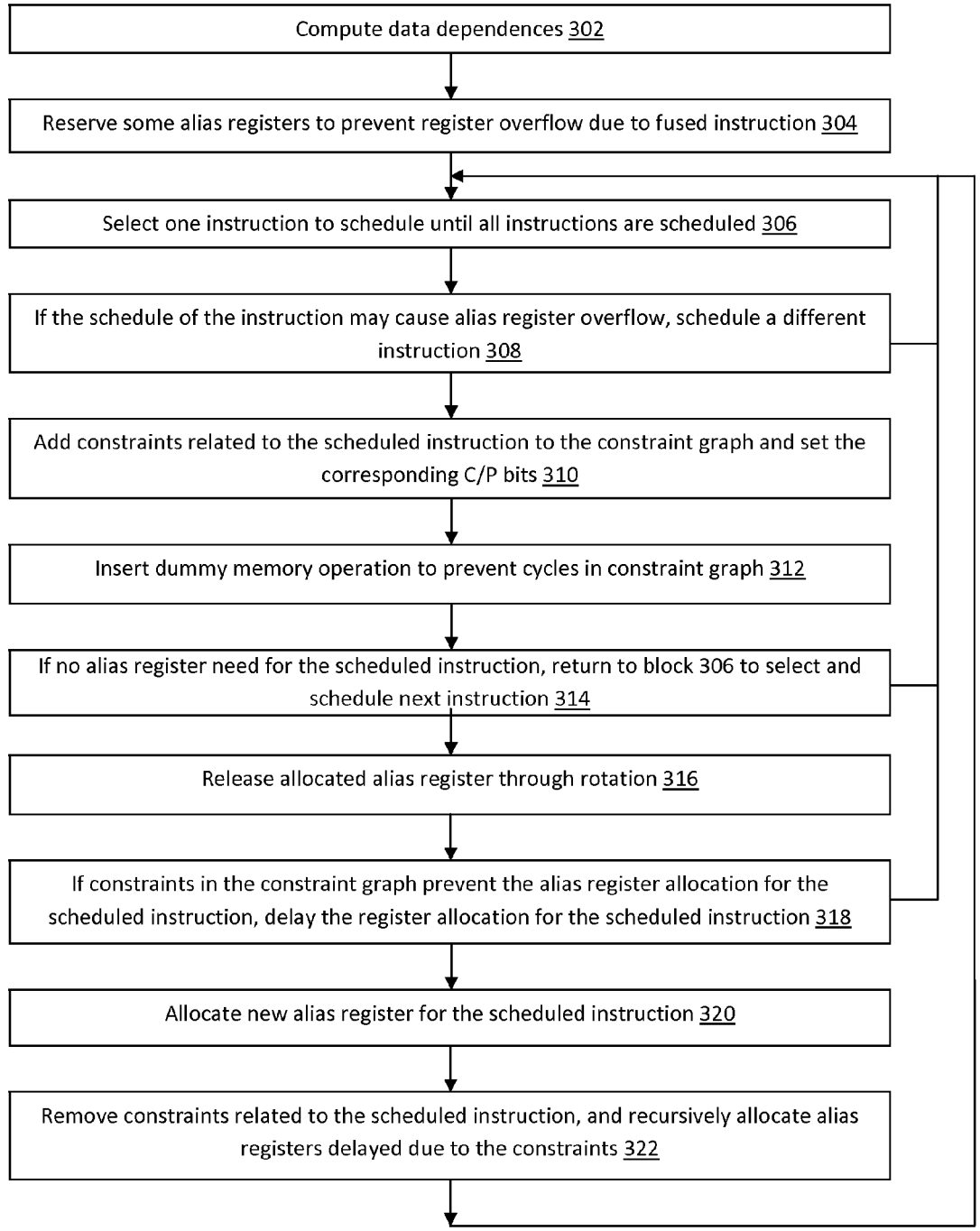
FIG. 3 is a flow chart in accordance with some embodiments of the invention.

FIG. 3 illustrates an embodiment of a method. The flow of FIG. 3 may be used to perform optimization and scheduling on original codes. In one embodiment, one or more embodiments as shown in FIGS. 2A to 2K may be used in the flow of FIG. 3. In one embodiment, the flow of FIG. 3 may be used to implement an optimizer/scheduler that may optimize and/or schedule original codes. In one embodiment, the optimizer/scheduler may be implemented by software; however, in some embodiments, the optimizer/scheduler may be implemented by hardware, software, firmware and/or any combination of them. In block 302, the optimizer/scheduler may compute data dependences such as A1→A2 between instruction A1 and A2. In block 304, the optimizer/scheduler may reserve a number of alias registers to prevent register overflow due to one or more fused instructions. In one embodiment, the number of alias registers may be equal to a number of the fused instructions; however, in some embodiments, the number of alias registers may have a different value. In block 306, the optimizer/scheduler may select one instruction, e.g., the second instruction A2, to schedule until all instructions in the original codes are scheduled.

In block 308, in response to determining that the schedule of the selected second instruction A2 may cause alias register overflow, the optimizer/scheduler may return to block 306, wherein the optimizer/scheduler may select a third instruction A3 other than the second instruction A2. In response to selecting the third instruction A3 in block 306, the optimizer/scheduler may determine if the third instruction A3 may run out of alias registers (block 308). If yes, the optimizer/scheduler may continue to select a different instruction to schedule until it is determined that the selected instruction may not cause alias register overflow. The optimizer/scheduler may schedule the selected instruction in response to determining that the selected instruction may not cause alias register overflow (block 308). In block 310, the optimizer/scheduler may add constraints relating to the scheduled instruction, e.g., A3, to the constraint graph (e.g., as shown in FIG. 2K) and set the corresponding C/P bits. In one embodiment, the optimizer/scheduler may add checking constraints and/or anti-checking constraints for the scheduled instruction A3 to the constraint graph or any other structure. In block 312, the optimizer/scheduler may insert dummy memory operation or codes to prevent cycles in the constraint graph. In one embodiment, the optimizer/scheduler may remove unnecessary C/P bits if the scheduled instruction A3 is a fused instruction. In another embodiment, if the scheduled instruction has C/P bits on multiple logical instructions, optimizer/scheduler may insert one or more dummy memory operation or instruction to partition the C/P bits. In another embodiment, if no alias register is needed for the scheduled instruction, the flow may go back to block 306 to select and schedule a next instruction (block 314). In block 316, optimizer/scheduler may release an allocated alias register through rotation. For example, the release may be implemented in response that the allocated alias register has been checked against and no other instruction to check against the allocated register. In one embodiment, the alias protection register may be released at the beginning of execution of a next instruction. In another embodiment, allocation for an alias protection register that is used by a current instruction may be delayed until the register being released at the beginning the execution of a next instruction. In block 316, AHPTR may be updated in response to the rotation. In block 318, if the constraints in the constraint graph prevent the alias register allocation for the scheduled instruction, e.g., if there are one or more constraints from a subsequent instruction that has not been scheduled, the optimizer/scheduler may delay the register allocation for the current scheduled instruction. In one embodiment, the alias register for the current scheduled instruction may be allocated in response to the subsequent instruction being scheduled.

For example, the flow may return to block 306 to select and schedule a next instruction. In block 320, in response to determining that the register allocation for the current scheduled instruction may not need to be delayed, the optimizer/scheduler may allocate an alias register for the scheduled instruction. In block 322, in response to allocating the new alias register for the scheduled instruction, the optimizer/scheduler may remove constraints related to the scheduled instruction, and/or may recursively allocate alias registers for the scheduled instruction whose register allocation is delayed due to the constraints.

In one embodiment, the embodiments of FIGS. 2A to 2K and FIG. 3 may be used for register allocation for rotation-based alias protection registers. In one embodiment, the embodiments may be used to reduce the number of registers used in rotation-based alias protection. For example, reducing alias register may be used for optimization benefits and performance. Reducing alias register may be used to enable reduction of the alias hardware to save die area and power consumption. While the method of FIG. 3 is illustrated to comprise a sequence of processes, the methods in some embodiments may perform illustrated processes in a different order. While the embodiments as shown in FIG. 3 and/or FIGS. 2A to 2K may be implemented by an optimizer/scheduler, in some embodiments, instruction optimizing and scheduling may be implemented separately by an optimizer and a scheduler, respectively, or in some embodiments, one or more logics such as a register allocation logic may be used to implement the embodiments of FIG. 3 and/or FIGS. 2A to 2K. In another embodiment, instruction optimizing and scheduling may be implemented by either an optimizer or a scheduler. While the embodiments as mentioned herein may relate to store and/or load instructions, in some embodiments, any other memory instructions may be utilized.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A method, comprising:
    computing a data dependence for a first instruction and a second instruction in a set of instructions;
    computing a first checking constraint for the first instruction and the second instruction to indicate that the first instruction is to check against a first alias register for the second instruction wherein the first checking constraint is computed in response that the first instruction and the second instruction have the data dependence and the second instruction is scheduled to execute before the first instruction;
    computing an anti-checking constraint in response that 1) the first instruction and the second instruction have the data dependence; 2) the first instruction is to set up a second alias register based on a second checking constraint for a third instruction and the first instruction; 3) the second instruction is to check against a third alias register based on a third checking constraint for the second instruction and a fourth instruction; and 4) the second instruction is not scheduled to execute before the first instruction; and
    allocating the first alias register for the second instruction based on the data dependence and the first checking constraint.

2. The method of claim 1, further comprising:
    releasing the first alias register for the second instruction by rotation in response to the first alias register having been checked.

3. The method of claim 1, further comprising:
    scheduling a fifth instruction in response to determining that the second instruction is to cause alias register overflow.

4. The method of claim 1, further comprising:
    fusing a fifth instruction and a sixth instruction in the set of instructions to provide a fused instruction.

5. The method of claim 1, further comprising:
    inserting a dummy instruction after a fused instruction in the set of instructions, wherein the dummy instruction is to access a same memory as the fused instruction and is to use a different alias register than the fused instruction.

6. A system, comprising:
    a memory; and
    a processor coupled to the memory, wherein the processor is to execute one or more instructions in the memory to:
    optimize a set of original codes to provide optimized codes that comprise a first instruction and a second instruction, wherein the first instruction is to be executed by the processor before the second instruction,
    schedule the optimized codes to provide scheduled codes to schedule the second instruction before the first instruction,
    compute a data dependence for the first instruction and the second instruction in the optimized codes,
    compute a first checking constraint for the first instruction and the second instruction in the scheduled codes to indicate that the first instruction is to check against a first alias register for the second instruction wherein the first checking constraint is computed in response that the first instruction and the second instruction have the data dependence and the second instruction is scheduled to execute before the first instruction,
    compute an anti-checking constraint in response that 1) the first instruction and the second instruction have the data dependence; 2) the first instruction is to set up a second alias register based on a second checking constraint for a third instruction and the first instruction; 3) tithe second instruction is to check against a third alias register based on a third checking constraint for the second instruction and a fourth instruction; and 4) the second instruction is not scheduled to execute before the first instruction;
    allocate the first alias register for the second instruction based on the data dependence and the first checking constraint, and
    rotate a pointer of the allocated first alias register to release the allocated first alias register in response to determining that the allocated first alias register has been checked against by the first instruction.

7. The system of claim 6, wherein the processor is to determine the data dependence for the first instruction and the second instruction in response to determining that the first instruction is to be executed before the second instruction in an original order, the first instruction and the second instruction are to access a same memory and at least one of the first instruction and the second instruction is a store instruction.

8. The system of claim 6, wherein the processor is further to optimize the set of original codes to provide fused codes to fuse at least two instructions and, in response to the fused codes comprising a first bit to indicate to set up a fourth alias protection register for the fused codes and a second bit to indicate that the fourth alias protection register is to be checked, insert dummy codes to partition the first bit and the second bit.

9. The system of claim 6, wherein the processor is further to insert dummy codes after fused codes, wherein the dummy codes are to access a same memory as the fused codes and are to use a different alias register than the fused codes.

10. The system of claim 6, wherein the processor is further to delay allocating the first alias register for the second instruction in response to detecting the first alias register for the second instruction is being used by a fifth instruction.

11. The system of claim 10, wherein the processor is further to insert dummy codes after register allocation delayed codes, wherein the dummy codes are to access a same memory as the register allocation delayed codes and are to use a different alias register than the register allocation delayed codes.

12. The system of claim 6, wherein the processor is further to remove the first checking constraint for the first instruction and the second instruction in response to the first alias register for the second instruction being allocated.

13. A non-transitory machine-readable medium containing instructions which, when executed by a computing system, cause the computing system to:
   schedule a set of instructions that comprises a first instruction and a second instruction;
   in response to determining that the second instruction is to be scheduled to be executed before the first instruction, compute a first checking constraint for the first instruction and the second instruction based on a data dependence of the first and the second instructions;
   in response that the second instruction is not to be scheduled to be executed before the first instruction, compute an anti-checking constraint for the first instruction and the second instruction based on the data dependence, a second checking constraint for a third instruction and the first instruction and a third checking constraint for the second instruction and a fourth instruction;
   allocate a first alias register for the second instruction based on the first checking constraint; and
   release the first alias register for the second instruction based on rotation.

14. The non-transitory machine readable medium of claim 13, further comprising a plurality of instructions that in response to being executed result in the computing system to:
   release the first alias register for the second instruction that is unused and allocate the released register for a fifth instruction.

15. The non-transitory machine-readable medium of claim 13, further comprising a plurality of instructions that in response to being executed result in a computing device to:
   insert a dummy instruction after a fused instruction in the set of instructions.

16. The non-transitory machine readable medium of claim 13, further comprising a plurality of instructions that in response to being executed result in the computing system to:
   rotate a pointer of the first alias register to release the first alias register in response to determining that the first alias register has been checked against by the first instruction.

* * * * *